Nov. 8, 1949  D. S. ANTHONY ET AL  2,487,209
CUTOFF TOOL HOLDER AND BLADE THEREFOR
Filed Feb. 16, 1945  2 Sheets-Sheet 1
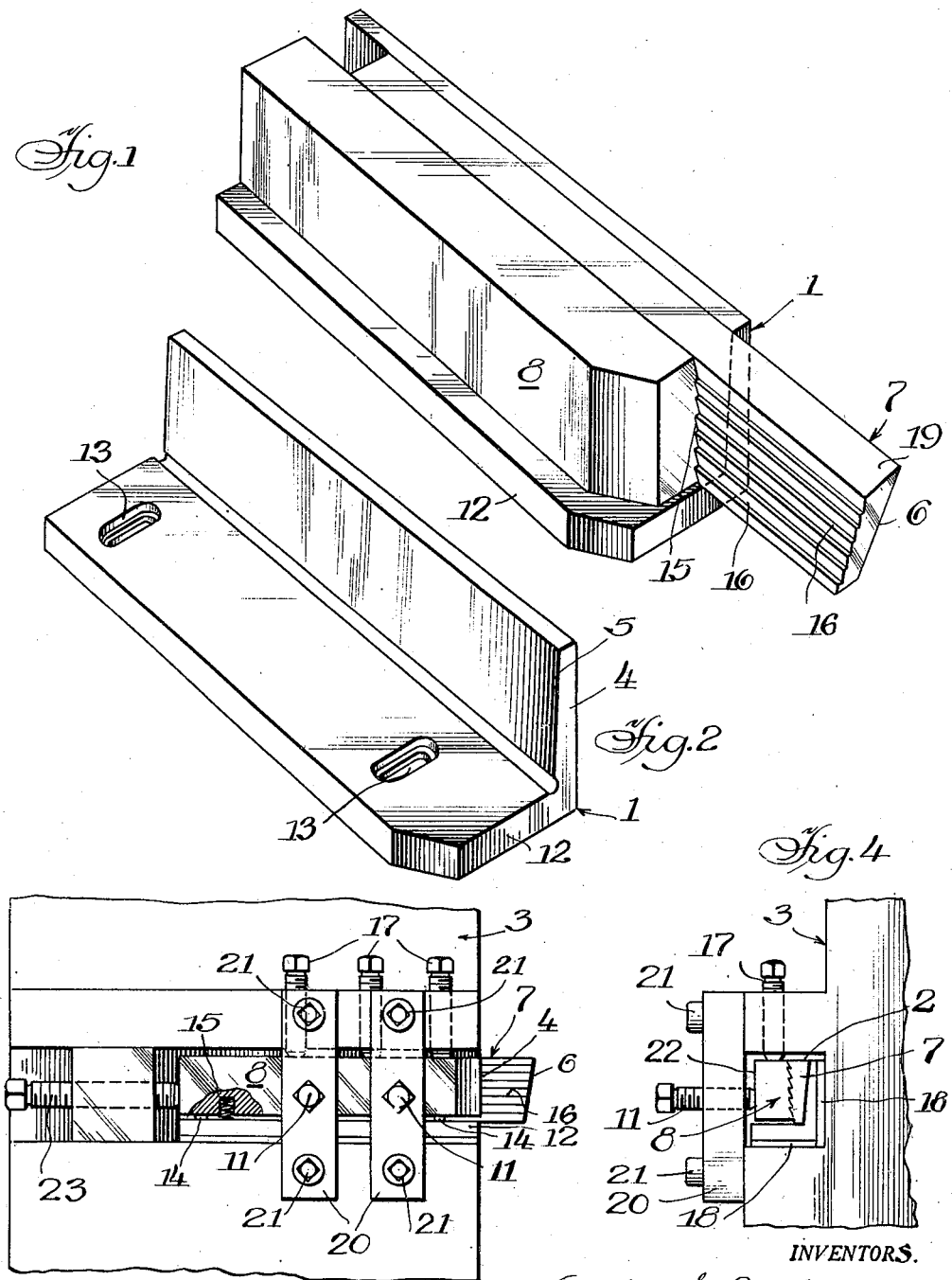
INVENTORS.
David S. Anthony
and William B. Blocker,
Parkinson & Lane Attys.

Nov. 8, 1949  D. S. ANTHONY ET AL  2,487,209
CUTOFF TOOL HOLDER AND BLADE THEREFOR
Filed Feb. 16, 1945  2 Sheets-Sheet 2
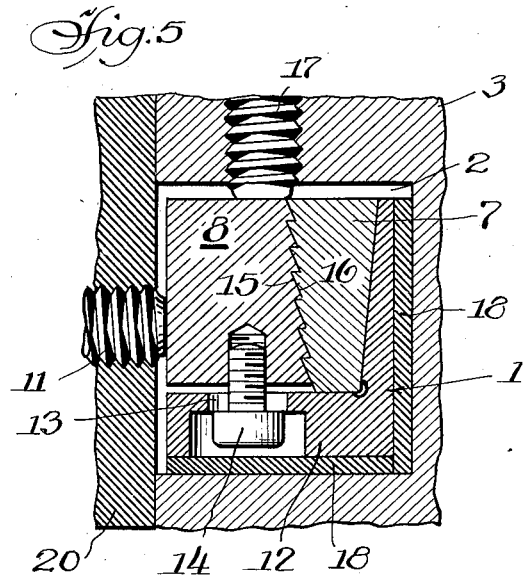
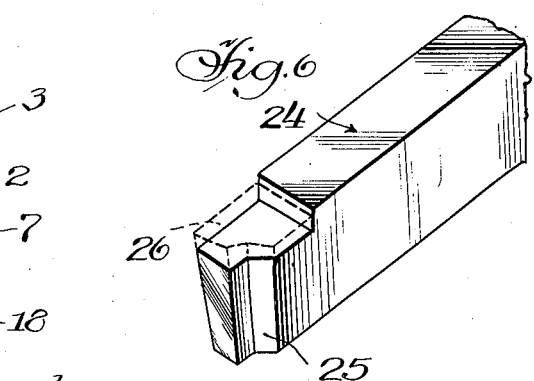
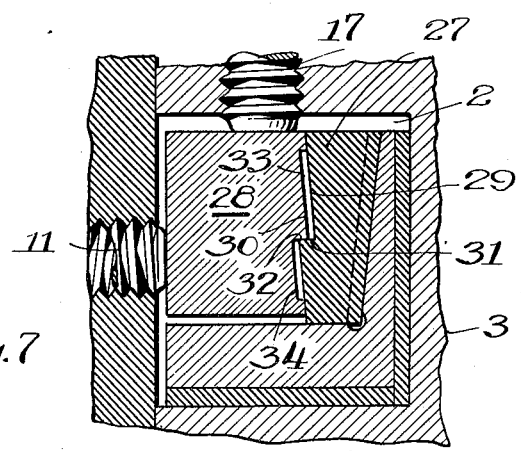
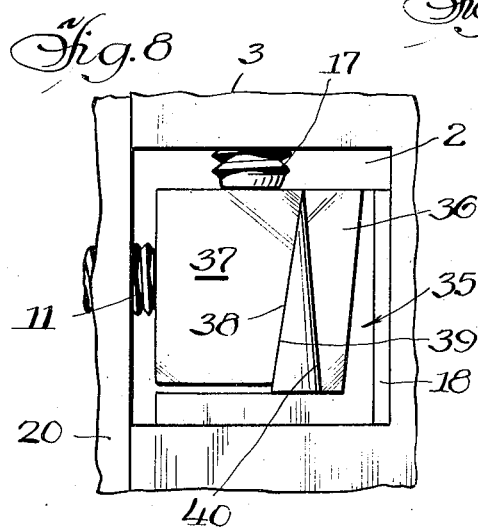
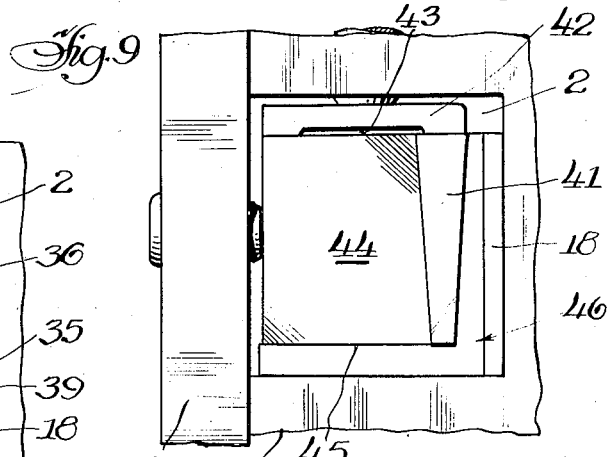
INVENTORS
David S. Anthony
and William B. Blocker
Parkinson & Lane Attys.

Patented Nov. 8, 1949

2,487,209

UNITED STATES PATENT OFFICE 2,487,209

CUTOFF TOOLHOLDER AND BLADE THEREFOR

David S. Anthony and William B. Blocker, San Antonio, Tex., assignors to Anthony Tool Company, San Antonio, Tex., a partnership Application February 16, 1945, Serial No. 578,292

5 Claims. (Cl. 29—96)

The present invention relates to novel tool holders and blades for use on shell making machines, lathes and the like, adapted for cutting off shells and making other heavy cut-offs with deep feed and at extremely high speeds. Such machines are provided or formed with an open slot or recess in a face thereof of such dimensions as to receive the solid shank of tools, one end of which may be machined off to a double bevel for a cut-off blade.

Among the objects of the present invention is to provide a holder adapted to be received in the slot or recess of such prior machines and so constructed and arranged as to hold a novel blade pre-formed or machined with the proper bevel on each side to provide the necessary clearance for the chips from the cutting operation. By the present construction of novel pre-formed blade and tool holder therefor, a great economy in time, labor and expense is effected in that each blade or tool need not be specially machined of solid stock, but a standardized shape of blade is provided.

A further object of the present invention is to provide a novel tool holder comprising a substantially L-shaped section and an adjustable block adapted to clamp therebetween and securely mount a pre-formed blade, the inner face of the block and the outer or adjacent face of the blade being so contoured that the cutter blade may be quickly locked and firmly retained in place for the cutting operation.

The invention further comprehends a novel means and manner of rigidly locking the blade in operative position, and further resides in a novel blade construction for use in making large diameter cut-offs.

Further objects are to provide a construction of maximum simplicity, efficiency, economy and ease of assembly and operation, and such further objects, advantages and capabilities as will later more fully appear and are inherently possessed thereby.

The invention further resides in the construction, combination and arrangement of parts illustrated in the accompanying drawings, and while there is shown therein a preferred embodiment, it is to be understood that the same is susceptible of modification and change, and comprehends other details, arrangements of parts, features and constructions without departing from the spirit of the invention.

In the drawings:

Figure 1 is a view in perspective of the novel tool holder and blade therefor.

Figure 2 is a view in perspective of the base or substantially L-shaped section of the holder.

Figure 3 is a view in side elevation of the holder and its mounting within a shell making machine, lathe or the like having a slot or recess in a face thereof.

Figure 4 is a view in front elevation thereof.

Figure 5 is a view in vertical cross section through the tool holder, blade and support.

Figure 6 is a perspective view showing a wide, chamfered blade to which a carbide tip has been affixed, the blade being particularly adapted for chamfering, in addition to cutting off.

Figure 7 is a view in vertical cross section similar to Figure 5 but showing an alternate manner of interlocking engagement between the tool holder and blade.

Figures 8 and 9 are views in front elevation of alternate constructions of tool holders and blades.

Referring more particularly to the illustrative embodiment disclosed in Figures 1 to 5, inclusive, of the drawings, the novel tool holder is shown as comprising a substantially L-shaped section 1 adapted to be received within and seat in the slot or recess 2 formed or provided in the face 3 of a shell making machine, lathe or the like. This slot is normally approximately two inches square and formed or cut out of the solid face of the machine for receiving a tool or blade. The vertical side or leg 4 of the substantially L-shaped section 1 is shown as having its rear face or surface disposed flat so as to conform to the vertical face of the slot or recess and having its forward surface 5 tapered in conformity with the contour of the rear face 6 of a cut-off blade 7. An adjustable block 8 has its inner face bevelled or contoured at the same angle as the outer bevelled face or side of the blade to permit the block 8 to press firmly against the blade and to prevent any sidewise movement of the blade when forced inwardly by spaced clamping screws 11.

In order to retain the block 8 upon the angular or L-shaped section 1, the horizontal side or leg 12 of this section is provided with a pair of spaced, transversely extending slots 13 countersunk to receive attaching bolts 14. The undersurface of the block is preferably provided with spaced openings 15 each adapted to receive a coil spring adapted to bear against the upper, flat face of the leg 12. By means of this assembly and arrangement, the block 8 may be laterally adjusted to receive blades of different thicknesses. As shown in Figures 4 and 5, this block is normally spaced from the upper surface or face of the horizontal leg 12 so as to permit the complementary shouldered or stepped faces 15 and 16 on the adjoining sides of the block 8 and blade 7 to interengage and interlock and when the top clamping screws or locking bolts 17 are screwed downwardly they engage this block and through the interlocking enagement thereof with the blade, to be forced firmly against the top of the horizontal face of the L-shaped section.

It is highly important that the blade itself seats firmly against this horizontal face to prevent damage to the cutting surface due to vibration, etc. Also it is desirable that the top surface of the blade and the top surface of the adjusting block be substantially parallel in order to permit the clamping screws 17 to press uniformly down on both the adjustable block and blade, should the end of the screw contact both. The top side of the blade and of each rib or shoulder thereon should be parallel to prevent rounding off and slipping of the adjustable block with respect to the blade.

In order that the blade be located so that its upper cutting edge be in proper position for the cut-off operation, it may be advisable to employ one or more shims or the like 18 to raise the point or edge 19 of the blade to the lathe center. Likewise, one or more shims 18 may be provided so as to permit adjustment in or out so that the cut-off will be made at the proper length of stock.

In order to securely retain the holder and blade in proper cutting relation, clamping plates 20 are provided. These plates are rigidly secured in spaced relation upon the face 3 of the machine by means of bolts or other securing means 21 disposed above and below the slot or recess 2, and each is provided with an adjusting screw 11 seating against the front face 22 of the adjustable block to lock the tool holder and blade in fixed position. An adjusting screw 23 is also preferably provided to adjust and lock the blade and/or holder longitudinally with respect to the machine.

Figure 6 shows a relatively thick blade 24 which may be mounted in the holder. This blade is of considerable thickness to permit its being cut away at 25 for chamfering the cut at the same time as cutting off. In addition to being of greater thickness than the blades shown in Figures 1, 4 and 5, it is also cut away at its top front end for affixing thereto a carbide tip 26. However, it is to be understood that all of the blades shown for certain work are similarly cut away at the top for affixing a carbide tip thereto.

Figure 7 shows a slightly different form of blade 27 and adjustable block 28 from that shown in Figures 1 to 5, inclusive. In this form, the tapered face 29 of the blade and the adjacent tapered face 30 of the block are each provided with a single shoulder or ledge 31 and 32, respectively. In addition, the face 30 of the block is cut away at 33 and 34 to assure the block being firmly pressed against the cutter blade at the top and bottom by the side clamping screws 11, thereby preventing any sidewise movement and firmly holding the cutter blade against any movement including vibration.

Figure 8 shows a further alternate construction of blade and tool holder therefor. As in the previous figures, these are adapted for mounting in the slot or recess. The holder comprises a substantially L-shaped section 35 adapted to receive a cutting blade 36 of tapered or bevelled contour and adapted to be locked in position by an adjustable block 37 having its inner face 38 tapered or bevelled in conformity with the tapered face 39 of the blade. However, the forward end of the blade that extends beyond the tool holder is ground off as at 40 for the desired length of cut.

The above embodiments are primarily for use where a thick blade is to be used and too little space is left between the lathe center and the top of the slot 2, thereby requiring an adjustable block pressing firmly against a specially constructed blade.

Figure 9 discloses a blade or tool holder adapted for use in the recess or slot 2 of a standard type or construction of double bevelled blade 41. Such a blade may be used where the machines have sufficient space between the upper point of the cutter blade on the lathe center and the upper edge of the slot or recess 2 to permit the use of a clamping shim 42. This shim is cut out or thinner at its center 43 so that its opposite edges bear against the top of an adjustable block 44 and the top of the blade 41, thus forcing the cutter blade firmly down onto the seat 45 of the substantially L-shaped section 46. In this construction, both the blade and block seat firmly on the L-shaped or angular section.

The blades shown in Figures 1 to 8, inclusive, are decided advances in the art over prior construction. Those shown in Figures 5, 6 and 7 are double bevelled with the outer face ribbed or provided with one or more shoulders affording a seat for the corresponding or complementary face on the adjusting block. Thus as the block is forced downwardly by the top clamping screws 17, it forces the blade firmly down against the base of the substantially L-shaped section, before any possible contact of the block with this base. In addition, these top clamping screws force the base of the L-shaped section down against the base of the recess or slot of the machine itself, giving a firm seat for the tool holder and blade assembly and thereby preventing vibration and consequent breaking off of the carbide tip.

In the making of the blades shown in Figures 1 to 6, inclusive, as the plane formed by the exterior of the ribs or stepped portions are tapered at the same bevel as the taper or bevel of the inside of the blade, these ribs or stepped portions need not be ground off. In the form shown in Figure 7, the slight extension of the single rib beyond the tool holder may be quickly ground off when sharpening the blade, or when applying a new carbide tip. Likewise the thick bevel shown in Figure 8 may be quickly ground off. In prior constructions, it is necessary to machine the double-bevelled blade from solid bar stock, which bar stock is hardened and must be annealed each time before it is machined and thereafter heat treated and ground to the proper bevel. Thus it will be seen that the invention comprehends a novel construction of tool holders and blades therefor.

Having thus described our invention, we claim:

1. A cut-off tool holder and blade therefor adapted to be mounted in a recess in the side face of a lathe or other machine, comprising a substantially L-shaped section, a cut-off blade and an adjustable block adapted to be received in said section, said adjustable block having its inner face contoured in substantial conformity with the adjacent face of the blade for retaining the blade in operative position, and complementary longitudinally extending shoulders on the blade and block for interlocking engagement.

2. A cut-off tool holder and blade therefor adapted to be mounted in a longitudinally extending channel-shaped recess in the face of a lathe or other machine, comprising a holder including an angular section having a horizontally extending base and an upright part conformably seating within the recess and a block adjustably connected to the base of the section, and a blade adapted to be received and anchored between the block and section for relatively deep and high speed cut-offs, said blade and block having co-acting and interlocking faces adapted to rigidly anchor the blade within the holder.

3. A cut-off tool holder and blade therefor adapted to be mounted in a longitudinally extending recess channelled in the side face of a lathe or other machine, comprising a holder including an angular section having a base and an upright leg conformably seating within the recess and a block adjustably mounted in the base of the section, and a blade adapted to be received and anchored between the block and the upright leg of the section for heavy and high speed cut-offs, said blade and block having interlocking, stepped faces for rigidly securing the blade in operative position.

4. A cut-off tool holder and blade therefor adapted to be mounted in a recess in the face of a lathe or other machine, comprising a holder including an angular section having a base and an upright leg conformably seating within the recess and a block adjustable with respect to the section, transverse slots in the base, attaching means carried in the base and extending through the slots and into the block, means for clamping the holder within the recess, a blade adapted to be received and anchored between the block and section for relatively deep and high speed cut-offs, and complementary bevelled faces on the blade and block for rigidly holding the blade in cut-off position.

5. A cut-off tool holder and blade therefor adapted to be mounted in a recess in the face of a lathe or other machine, comprising a holder including an angular section conformably seating within the recess and a block adjustable with respect to the section for mounting blades of varying thicknesses, the base of said section being provided with elongated slots, attaching screws mounted in the base and extending through the slots and into the block for adjustably mounting the latter on the base, means for rigidly mounting the holder in the recess, and a double bevelled blade mounted between the block and section.

DAVID S. ANTHONY.
WILLIAM B. BLOCKER.

REFERENCES CITED

The following references are of record in the file of this patent:

UNITED STATES PATENTS

| Number | Name | Date |
| --- | --- | --- |
| 980,309 | Marconini | Jan. 3, 1911 |
| 1,011,715 | Baker | Dec. 12, 1911 |
| 1,045,512 | Carr | Nov. 26, 1912 |
| 1,491,713 | Lowe | Apr. 22, 1924 |
| 2,037,642 | Scribner | Apr. 14, 1936 |
| 2,101,157 | Redinger | Dec. 7, 1937 |
| 2,173,848 | Kraus | Sept. 26, 1939 |
| 2,173,868 | Weddell et al. | Sept. 26, 1939 |
| 2,188,917 | Poorman | Feb. 6, 1940 |
| 2,241,024 | Wahnish | May 6, 1941 |
| 2,296,597 | Carr | Sept. 22, 1942 |

Certificate of Correction

Patent No. 2,487,209 November 8, 1949

DAVID S. ANTHONY ET AL

It is hereby certified that errors appear in the printed specification of the above numbered patent requiring correction as follows:

Column 3, line 8, after the word and comma "blade," insert *cause the blade*; line 72, after "recess" and before the period insert the numeral *2*;

and that the said Letters Patent should be read with these corrections therein that the same may conform to the record of the case in the Patent Office.

Signed and sealed this 28th day of February, A. D. 1950.

[SEAL]

THOMAS F. MURPHY,
*Assistant Commissioner of Patents.*